(12) United States Patent
Fredrich

(10) Patent No.: US 12,460,776 B2
(45) Date of Patent: Nov. 4, 2025

(54) ELECTRONICALLY ACTIVATED, SPRING-DRIVEN INITIATOR

(71) Applicant: B/E Aerospace, Inc., Winston Salem, NC (US)

(72) Inventor: Jeremy John Fredrich, West Allis, WI (US)

(73) Assignee: B/E AEROSPACE, INC., Winston Salem, NC (US)

( * ) Notice: Subject to any disclaimer, the term of this patent is extended or adjusted under 35 U.S.C. 154(b) by 184 days.

(21) Appl. No.: 18/446,158

(22) Filed: Aug. 8, 2023

(65) Prior Publication Data

US 2025/0052376 A1  Feb. 13, 2025

(51) Int. Cl.
 F17C 13/06 (2006.01)
 F16K 1/30 (2006.01)
 F17C 13/04 (2006.01)

(52) U.S. Cl.
 CPC .............. *F17C 13/06* (2013.01); *F16K 1/307* (2013.01); *F17C 13/04* (2013.01); *F17C 2205/0314* (2013.01)

(58) Field of Classification Search
 CPC .............. F17C 13/06; F17C 2205/0317; Y10T 137/1797; F16K 17/383
 See application file for complete search history.

(56) References Cited

U.S. PATENT DOCUMENTS

| | | | | |
|---|---|---|---|---|
| 824,934 A * | 7/1906 | Jenczwsky | ............ | F16K 17/383 137/75 |
| 824,935 A * | 7/1906 | Jenczwsky | ............ | F16K 17/383 137/76 |
| 2,012,873 A * | 8/1935 | Gillen | .................... | F16K 17/383 251/74 |
| 2,066,129 A | 12/1936 | Triplett | | |
| 2,200,608 A | 5/1940 | Triplett | | |
| 2,586,248 A * | 2/1952 | Newman | ............... | F16K 17/383 137/74 |
| 2,998,018 A * | 8/1961 | Beck | ..................... | F16K 17/383 222/3 |
| 3,008,479 A | 11/1961 | Mancusi, Jr. | | |
| 4,164,953 A * | 8/1979 | Naab | ....................... | F16K 17/40 137/72 |

(Continued)

FOREIGN PATENT DOCUMENTS

KR  20200061091  6/2020

OTHER PUBLICATIONS

European Patent Office, European Search Report dated Jan. 7, 2025 in Application No. 24193403.3.

*Primary Examiner* — Kenneth Rinehart
*Assistant Examiner* — Nicole Gardner
(74) *Attorney, Agent, or Firm* — SNELL & WILMER L.L.P.

(57) ABSTRACT

An initiator for opening a pressurized gas cylinder is disclosed herein. The initiator includes a housing having a first end and a second end, a lance disposed within the housing, the lance configured to slide from the first end of the housing to the second end of the housing and out through the second end of the housing, a spring disposed within the housing between the first end of the housing and the lance, and a wire coupled to the first end of the housing and to the lance, the wire configured to hold the spring in a compressed state, the wire further configured to break in response to an electric current.

9 Claims, 9 Drawing Sheets

(56) References Cited

U.S. PATENT DOCUMENTS

| | | | |
|---|---|---|---|
| 4,745,940 A * | 5/1988 | Ely | F16K 17/366 137/39 |
| 5,509,576 A | 4/1996 | Weinheimer et al. | |
| 2010/0206390 A1 * | 8/2010 | Hollars | F16K 17/403 222/5 |
| 2022/0055722 A1 | 2/2022 | Gummin et al. | |

* cited by examiner

ELECTRONICALLY ACTIVATED, SPRING-DRIVEN INITIATOR

FIELD

The present disclosure generally relates compressed fluid sources, and more particularly, to compressed fluid source initiators.

BACKGROUND

Oxygen systems may be used in aircraft that typically include a pressurized fluid cylinder, a manifold, and an initiator to puncture a seal of the pressurized fluid cylinder. Typically, the initiator uses a pyrotechnic chemical to fire a lance of the initiator toward the seal of the pressurized fluid source.

An emergency evacuation assembly may be used to exit an aircraft absent a jet way or other suitable means of egress for passengers. The evacuation assembly may include an inflatable slide and one or more compressed fluid source(s) configured to inflate the slide. Current compressed fluid sources may include an initiator valve assembly configured to open in response to deployment of the evacuation slide, thereby allowing fluid to flow to the evacuation slide.

Currently, compressed fluid sources or compressed gas cylinders use a valve module that is directly assembled to the cylinder that allows the compressed gas to exit the cylinder. The valve may also be used to fill the cylinder with gas. However, the valve may be prone to leaking air from the cylinder over time. Additionally, the valve may be generally attached to the cylinder using a threaded interface and a static seal at the threaded interface that may be prone to leaking over time.

SUMMARY

Disclosed herein is an initiator for opening a pressurized gas cylinder. The initiator includes a housing having a first end and a second end, a lance disposed within the housing, the lance configured to slide from the first end of the housing to the second end of the housing and out through the second end of the housing, a spring disposed within the housing between the first end of the housing and the lance, and a wire coupled to the first end of the housing and to the lance, the wire configured to hold the spring in a compressed state, the wire further configured to break in response to an electric current.

In various embodiments, the lance further includes a lance body configured to stay within the housing, wherein the wire is coupled to the lance body, and a lance end coupled to the lance body and configured to pass through the second end of the housing. In various embodiments, the initiator further includes an anchor point coupled to the lance, wherein the wire is configured to enter the housing, wrap around the anchor point, and exit the housing.

In various embodiments, the initiator further includes a first anchor point coupled to the lance, a second anchor point coupled to the lance, and a third anchor point coupled to the housing, wherein the wire is configured to enter the housing, wrap around the first anchor point, wrap around the third anchor point, wrap around the second anchor point, and exit the housing.

In various embodiments, the initiator further includes a first plurality of anchor points coupled to the lance, and a second plurality of anchor points coupled to the housing, the wire configured to enter the housing, wrap alternately around the first plurality of anchor points and the second plurality of anchor points, and exit the housing. In various embodiments, the first plurality of anchor points are spaced around the lance and equidistant from each other, and wherein the second plurality of anchor points are spaced around the first end of the housing and equidistant from each other. In various embodiments, the lance is hollow and has a first end adjacent the first end of the housing and a second end, wherein the spring is disposed between the first end of the housing and the second end of the lance.

Also disclosed herein is a system including a compressed gas cylinder and an initiator configured to open the compressed gas cylinder. The initiator includes a housing having a first end and a second end, a lance disposed within the housing, the lance configured to slide from the first end of the housing to the second end of the housing and out through the second end of the housing, a spring disposed within the housing between the first end of the housing and the lance, and a wire coupled to the first end of the housing and to the lance, the wire configured to hold the spring in a compressed state, the wire further configured to break in response to an electric current.

In various embodiments, the lance further includes a lance body configured to stay within the housing, wherein the wire is coupled to the lance body and a lance end coupled to the lance body and configured to pass through the second end of the housing. In various embodiments, the initiator further includes an anchor point coupled to the lance, wherein the wire is configured to enter the housing, wrap around the anchor point, and exit the housing.

In various embodiments, the initiator further includes a first anchor point coupled to the lance, a second anchor point coupled to the lance, and a third anchor point coupled to the housing, wherein the wire is configured to enter the housing, wrap around the first anchor point, wrap around the third anchor point, wrap around the second anchor point, and exit the housing.

In various embodiments the initiator further includes a first plurality of anchor points coupled to the lance and a second plurality of anchor points coupled to the housing, the wire configured to enter the housing, wrap alternately around the first plurality of anchor points and the second plurality of anchor points, and exit the housing. In various embodiments, the first plurality of anchor points are spaced around the lance and equidistant from each other, and wherein the second plurality of anchor points are spaced around the first end of the housing and equidistant from each other.

In various embodiments, the lance is hollow and has a first end adjacent the first end of the housing and a second end, wherein the spring is disposed between the first end of the housing and the second end of the lance.

Also disclosed herein is a system including a pressurized cylinder, a manifold coupled to the pressurized cylinder, and an initiator coupled to the manifold and configured to open the pressurized cylinder. The initiator includes a housing having a first end and a second end, a lance disposed within the housing, the lance configured to slide from the first end of the housing to the second end of the housing and out through the second end of the housing, a spring disposed within the housing between the first end of the housing and the lance, and a wire coupled to the first end of the housing and to the lance, the wire configured to hold the spring in a compressed state, the wire further configured to break in response to an electric current.

In various embodiments, the lance further includes a lance body configured to stay within the housing, wherein the wire is coupled to the lance body and a lance end coupled to the lance body and configured to pass through the second end of the housing. In various embodiments, the initiator further includes an anchor point coupled to the lance, wherein the wire is configured to enter the housing, wrap around the anchor point, and exit the housing.

In various embodiments, the initiator further includes a first anchor point coupled to the lance, a second anchor point coupled to the lance, and a third anchor point coupled to the housing, wherein the wire is configured to enter the housing, wrap around the first anchor point, wrap around the third anchor point, wrap around the second anchor point, and exit the housing.

In various embodiments, the initiator further includes a first plurality of anchor points coupled to the lance and a second plurality of anchor points coupled to the housing, the wire configured to enter the housing, wrap alternately around the first plurality of anchor points and the second plurality of anchor points, and exit the housing. In various embodiments, the first plurality of anchor points are spaced around the lance and equidistant from each other, and wherein the second plurality of anchor points are spaced around the first end of the housing and equidistant from each other.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
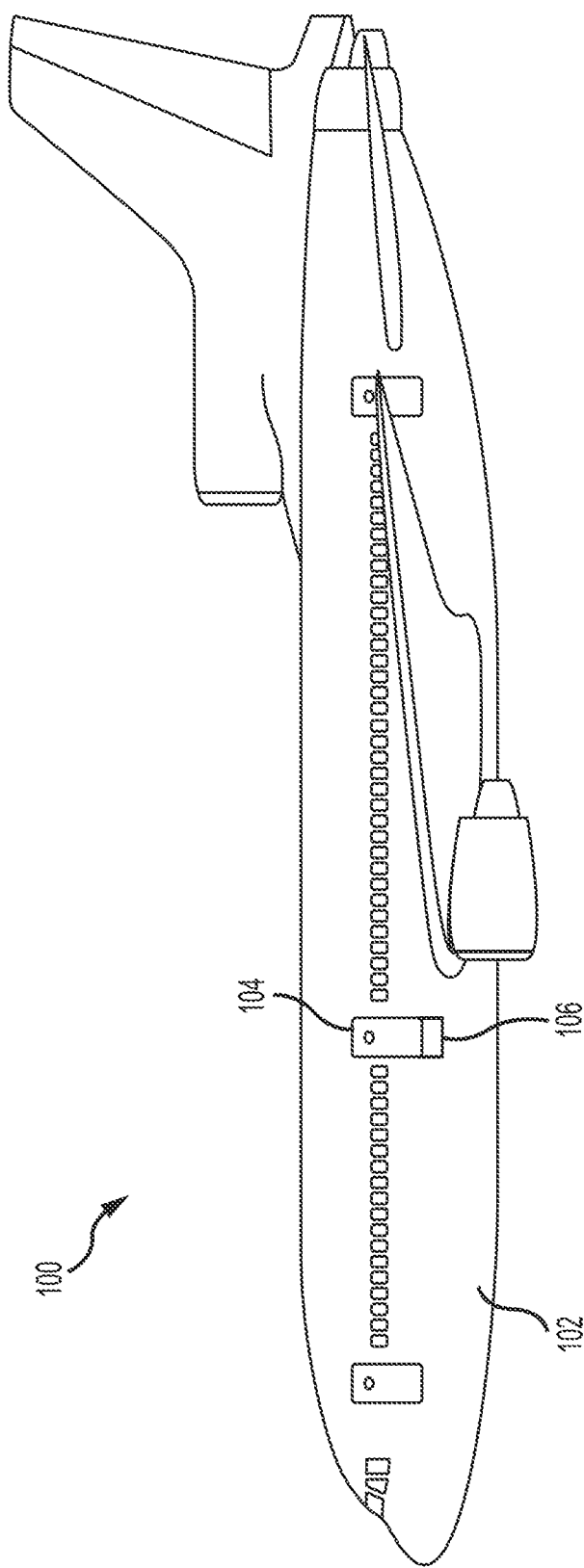
FIG. 1 illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are is an electrically activated, spring loaded initiator for opening a compressed fluid source such as a compressed gas cylinder. In various embodiments, the compressed fluid source may be used to inflate an inflatable (e.g., a life raft, an emergency slide, etc.) or to provide oxygen to a compartment (e.g., cockpit, storage bay, passenger cabin, etc.) among others. In various embodiments, the initiator may be coupled to a manifold that is coupled to the compressed fluid source. In various embodiments, the initiator includes a housing, a lance, a spring, and a fuse wire. In various embodiments, the initiator is packed to an initial depth of a loaded state, compressing the spring, and held at the initial depth using the fuse wire. In various embodiments, the tensile strength of the fuse wire holds the initiator in the loaded state until the initiator is activated. In various embodiments, the fuse wire breaks, or melts, in response to an electric current, thereby allowing the lance to deploy and open the compressed fluid source. In various embodiments, the spring pressure holds the lance forward after being deployed to ensure the release of all, or substantially all, of the gas in the pressurized fluid source.

In various embodiments, the fuse wire may be tested for electric continuity to ensure that the fuse wire has not broken and that the initiator remains usable. In various embodiments, the fuse wire is coupled to the lance using a lever, a pulley, a knob, a pin, or a bar, among others, to increase the mechanical advantage of the fuse wire to hold the spring in the loaded state. In various embodiments, more than a one lever, pulley, knob, pin, or bar may be used and the fuse wire may be wrapped around, or secured to, each of the multiple levers, pulleys, knobs, and/or bars to increase the mechanical advantage of the fuse wire to hold the spring in the loaded state.

The initiator as disclosed herein obviates the pyrotechnic lances that currently propels the lance to open the pressurized fluid source. This increases the number of locations that the initiator can be used while, in various embodiments, reducing the complexity and safety issues associated with pyrotechnic lances. Furthermore, the initiator as disclosed herein, in various embodiments, uses fewer O-rings and/or interfaces than initiators that are currently in use. In various embodiments, the initiator as disclosed herein reduces, or removes, the use of a quick-release mechanisms that are currently in use with various initiators. Other benefits and advantages will be apparent to those of skill in the art.

Referring now to FIG. 1, an aircraft 100 is shown. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2:
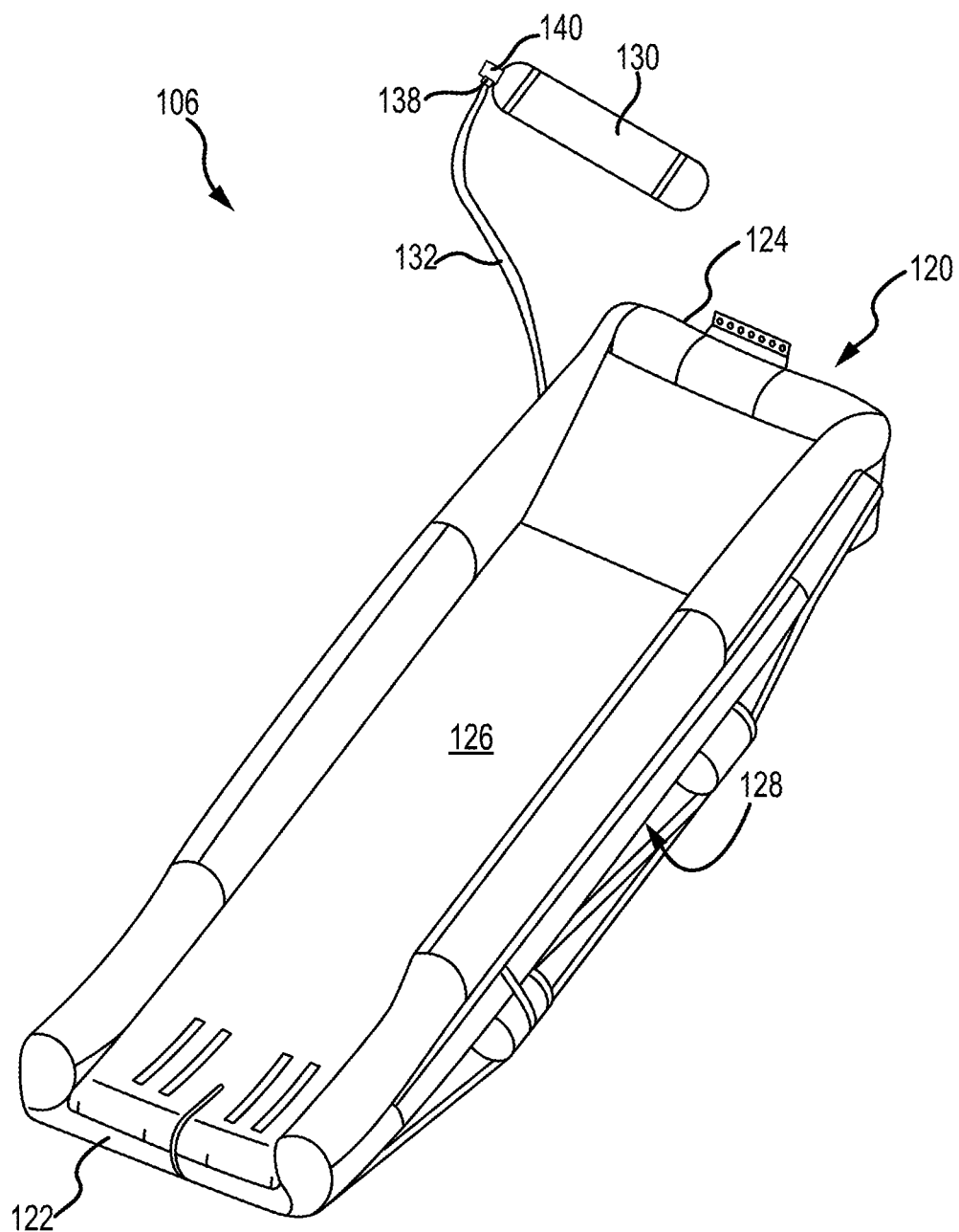
FIG. 2 illustrates an evacuation assembly including an evacuation slide and a compressed fluid source, in accordance with various embodiments.

With reference to FIG. 2, additional details of evacuation assembly 106 are illustrated. In accordance with various embodiments, evacuation assembly 106 includes an evacuation slide 120 and a compressed fluid source 130. In accordance with various embodiments, evacuation slide 120 includes a toe end 122 and a head end 124 opposite toe end 122. Head end 124 may be coupled to an aircraft structure (e.g., fuselage 102 in FIG. 1). In accordance with various embodiments, evacuation slide 120 is an inflatable slide. Evacuation slide 120 includes a sliding surface 126 and an underside surface 128 opposite sliding surface 126. Sliding surface 126 extends from head end 124 to toe end 122. During an evacuation event, underside surface 128 may be oriented toward an exit surface (e.g., toward the ground or toward a body of water). Evacuation slide 120 is illustrated as a single lane slide; however, evacuation slide 120 may comprise any number of lanes.

Evacuation assembly 106 includes compressed fluid source 130 (also referred to as a charge cylinder, compressed gas cylinder, or gas cylinder). Compressed fluid source 130 is configured to deliver a pressurized gas to inflate evacuation slide 120. Compressed fluid source 130 is fluidly coupled to evacuation slide 120. For example, compressed fluid source 130 may be fluidly coupled to evacuation slide 120 via a hose, or conduit, 132. In response to receiving gas from compressed fluid source 130, evacuation slide 120 begins to inflate.

In accordance with various embodiments, conduit 132 may be connected to a valve outlet 138 of a valve assembly 140 fluidly coupled to compressed fluid source 130. In this regard, valve assembly 140 is fluidly coupled between compressed fluid source 130 and conduit 132. Valve assembly 140 is configured to regulate the flow of fluid from compressed fluid source 130 to evacuation slide 120. In this regard, when evacuation slide 120 is in a stowed (or deflated) state, valve assembly 140 is in a closed position. In response to deployment of evacuation assembly 106, valve assembly 140 translates to an open position, thereby allowing fluid to flow from compressed fluid source 130 to evacuation slide 120.

Figure 3A:
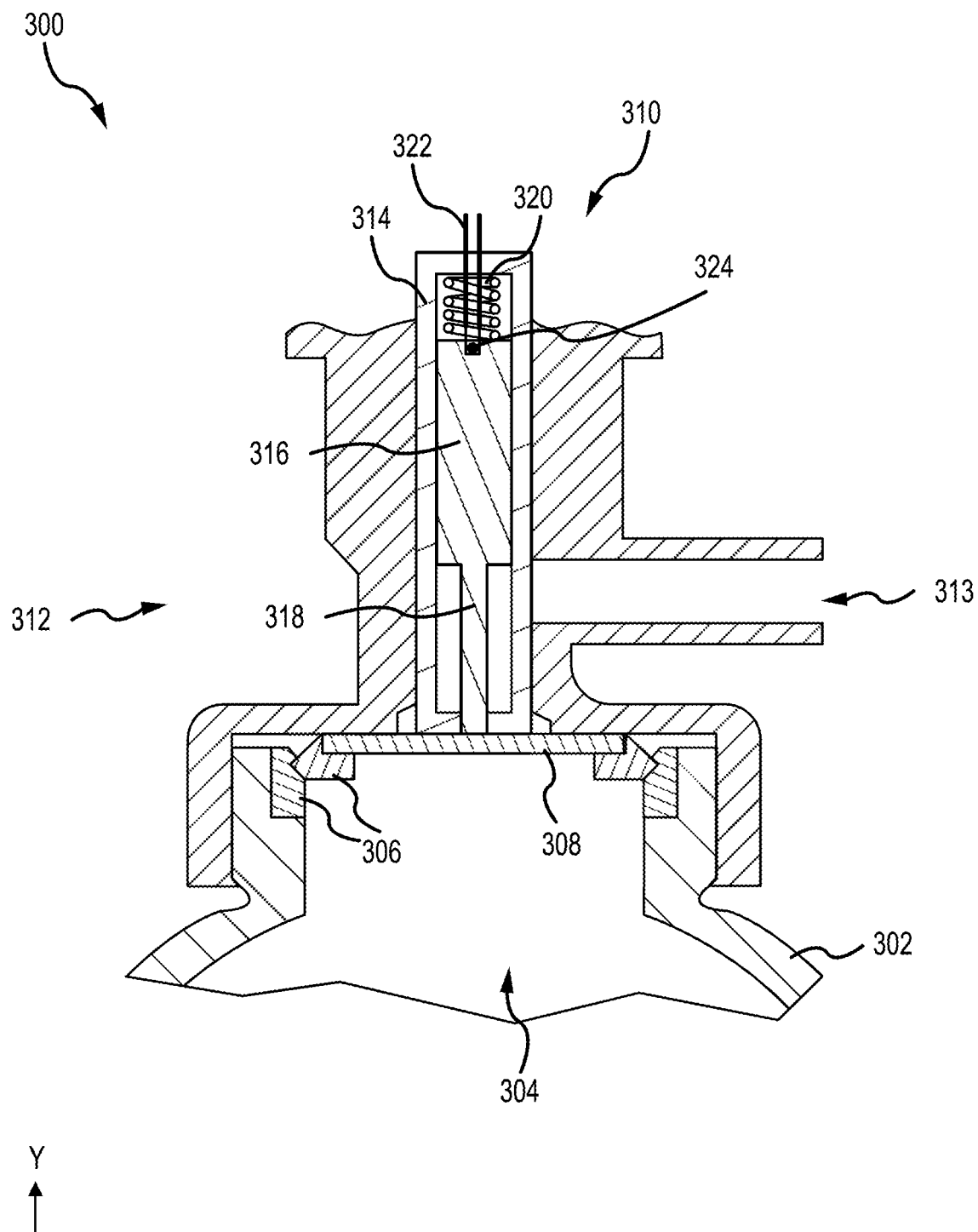
FIGS. 3A and 3B illustrate a compressed fluid cylinder manifold and initiator, in accordance with various embodiments.
Figure 3B:
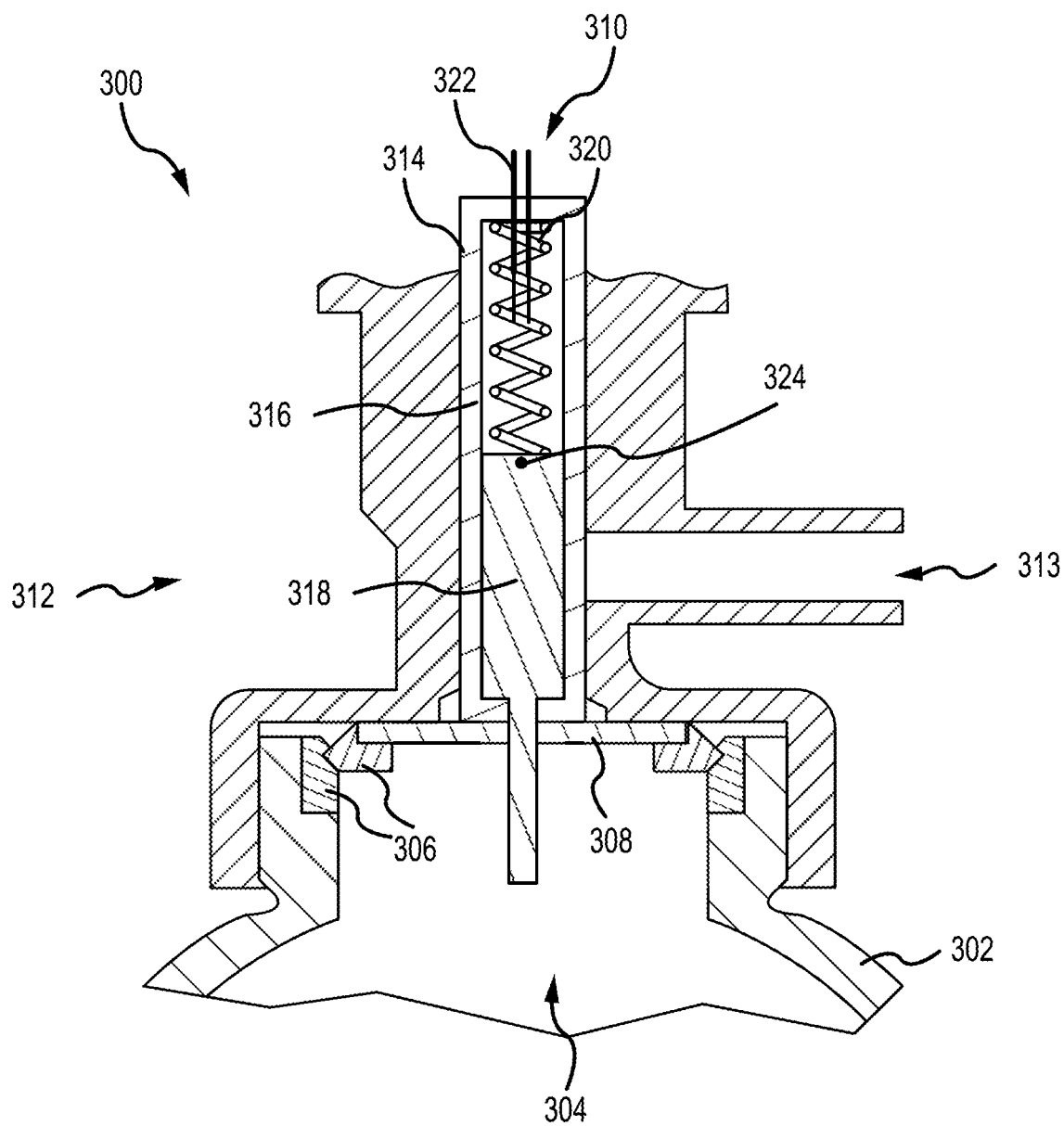

Referring now to FIGS. 3A and 3B, in accordance with various embodiments, cross section views of a valve assembly 300 for opening a pressurized cylinder 302 is illustrated. FIG. 3A illustrates a cross section view of actuation device 300 in a closed position. FIG. 3B illustrates a cross section view of actuation device 300 in an open position. In various embodiments, valve assembly 300 may be an example of valve assembly 140 described above in FIG. 2. In various embodiments, pressurized cylinder 302 may be an example of compressed fluid source 130 described above in FIG. 2. Pressurized cylinder 302 includes an opening 304, metal inserts 306, and a fracture disk 308. Metal inserts 306 are connected to opening 304 and around the circumference of opening 304. In various embodiments, metal inserts 306 may be welded to opening 304 of pressurized cylinder 302. Fracture disk 308, also referred to as a diaphragm, is connected to metal inserts 306. In various embodiments, pressurized cylinder 302 is hermetically sealed. In various embodiments, pressurized cylinder 302 may be filled with pressurized gas from a bottom portion (e.g., the negative y-direction) of pressurized cylinder 302.

Valve assembly 300 includes an electronically activated, spring-driven initiator, initiator 310, and a manifold 312, where the manifold 312 is configured to receive initiator 310 and connect to pressurized cylinder 302. In various embodiments, manifold 312 is threaded onto pressurized cylinder 302. Initiator 310 is configured to puncture, or break, fracture disk 308 to release the gas stored in pressurized cylinder 302 in response to an electric current. Manifold 312 includes an air outlet 313 that may be connected to an inflatable slide (e.g., evacuation slide 120), an inflatable raft, or an oxygen system, among other applications. In various embodiments, the gas stored in pressurized cylinder may flow from pressurized cylinder 302, through opening 304, and through air outlet 313 into the inflatable in response to fracture disk 308 being broken, or punctured. In various embodiments, initiator 310 may be used to open a manifold, or other pressurized and/or sealed components.

Initiator 310 includes a housing 314, a lance body 316, a lance end 318, a spring 320, a wire 322, and an anchor point 324. Lance body 316 and lance end 318 may be collectively referred to as a lance. In various embodiments, initiator 310 may be cylindrical in shape so that housing 314 may be cylindrical in shape having a circular first end (e.g., in the positive y-direction), a circular bottom end (e.g., in the negative y-direction), and an outer wall extending from the first end to the second and circumferentially around lance body 316. In various embodiments, lance body 316 may also be cylindrical in shape. In various embodiments, spring 320 is configured to engage a first end of lance body 316 (e.g., in the positive y-direction). In various embodiments, lance body 316 may be tubular in shape having a hollow center that is configured to receive spring 320.

Lance end 318 includes a first end (e.g., in the positive y-direction) and a second end (e.g., in the negative y-direction). In various embodiments, the first end of lance end 318 is coupled to a second end of lance body 316 (e.g., in the negative y-direction) and is configured to puncture, or break, fracture disk 308. Accordingly, housing 314 includes an opening in the second end (e.g. in the negative y-direction) that allows lance end 318 to pass through housing 314 to engage and break fracture disk 308. In various embodiments, the second end of lance end 318 may be blunt. In various embodiments, the second end of lance end 318 may be sharp to more efficiently break fracture disk 308. In various embodiments, the second end of lance end 318 may be frustoconical or conical in shape.

Anchor point 324 is coupled at or near the first end of lance body 316. Wire 322, also referred to as a fuse wire, passes through housing 314, around anchor point 324, and back through housing 314. This configuration increases the mechanical advantage of wire 322 enabling wire 322 to exert more force on spring 320. Wire 322 is configured to melt in response to an electric current and break, similar to a fuse. This creates a single point of failure that releases the tension in wire 322 in response to wire 322 melting, or breaking. In various embodiments, a first electric current that is above a melt threshold may be used to trigger initiator 310 by melting wire 322. In various embodiments, a second electric current that is less than the melt threshold may be used to test wire 322 for continuity (i.e., no breaks) to ensure that initiator 310 is usable. FIG. 3A illustrates initiator 310 in a loaded position, or state, and pressurized cylinder 302 is closed. FIG. 3B illustrates initiator 310 in a deployed position, or state and pressurized cylinder 302 is opened. In response to deployment of an evacuation assembly (e.g., evacuation assembly 106), an electric current is passed through wire 322 which causes wire 322 to break, thereby causing initiator 310 to move from the loaded position to the deployed position. In response to wire 322 breaking, spring 320 extends pushing lance body 316, and by extension lance end 318, toward pressurized cylinder 302 and fracture disk 308 (e.g., in the negative y-direction) with sufficient force to break fracture disk 308. The gas in pressurized cylinder 302 escapes pressurized cylinder 302 through opening 304 and through air outlet 313 in response to fracture disk 308 being broken by initiator 310.

Figure 4A:
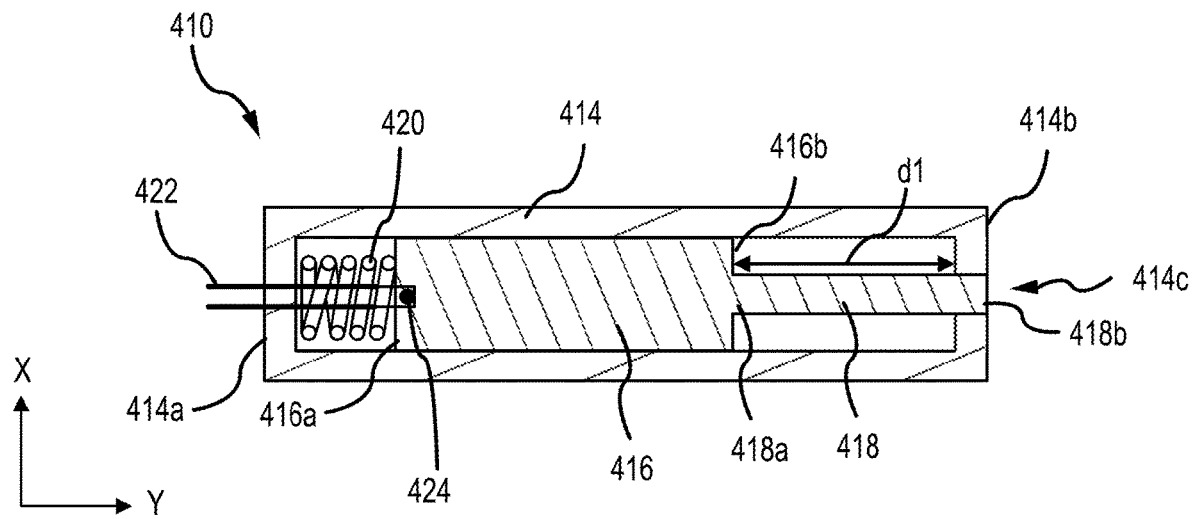
FIGS. 4A and 4B illustrate an electronically activated, spring loaded initiator for opening compressed gas cylinders.
Figure 4B:
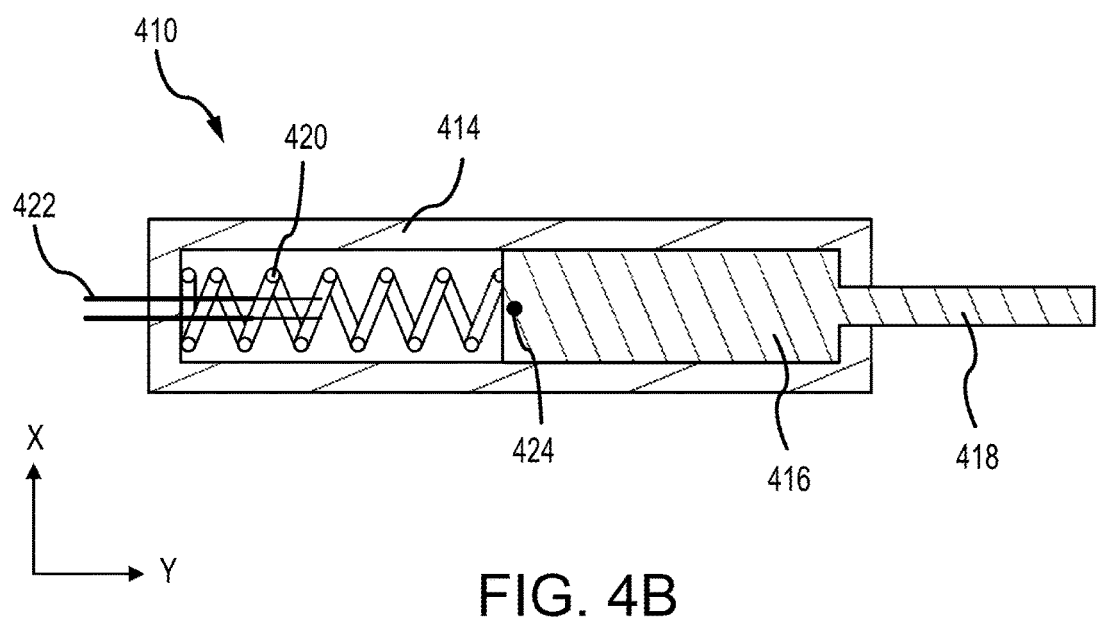

Referring now to FIGS. 4A and 4B, an electronically activated, spring driven initiator, initiator 410, is illustrated, in accordance with various embodiments. Initiator 410 includes similar components to those described above with respect to initiator 310 in FIGS. 3A and 3B, including a housing 414, a lance body 416, a lance end 418, a spring 420, a wire 422, and an anchor point 424, descriptions of which may not be repeated below. FIG. 4A illustrates a cross section view of initiator 410 in a loaded position, or state. In the loaded position, lance body 416 and lance end 418 are retracted into housing 414 and spring 420 is compressed. In various embodiments, lance end 418 may exposed and protrude from housing 414 (e.g., in the positive y-direction) while initiator 410 is in the loaded position. FIG. 4B illustrates a cross section view of initiator 410 in a deployed position, or state. In the deployed position, lance end 418 extends out of housing 414 and spring 420 is extended. Lance body 416 and lance end 418 move a distance d1 from the loaded position to the deployed position. In various, embodiments, distance d1 is about 0.1 inches (about 0.254 centimeter) to about 1.0 inches (about 2.54 centimeters), and more specifically, about 0.25 inches (about 0.635 centimeter) to about 0.5 inches (about 1.27 centimeters).

Housing 414 has a first end 414a, a second end 414b, and an opening 414c in second end 414b. In various embodiments, housing 414 may be cylindrical in shape. Housing 414 encloses lance body 416, spring 420, and at least a portion of lance end 418. Lance body 416 is configured to slide (e.g., along the y-axis) within housing 414. In various embodiments, an outer surface of lance body 416 may be in contact with an inner surface of housing 414. In various embodiments, there may be a gap between the outer surface of lance body 416 and the inner surface of housing 414. In various embodiments, the gap may be configured to allow a fluid, or gas, to pass through housing 414. In various embodiments, housing 414 may further include an anti-friction sleeve and/or O-rings between the outer surface of lance body 416 and the inner surface housing 414.

Lance body 416 has a first end 416a and a second end 416b. Lance end 418 has a first end 418a and a second end 418b. Spring 420 is in contact with an inner surface of first end 414a of housing 414 at a first end and in contact with first end 416a of lance body 416 at a second end. In various embodiments, lance body 416 may be solid such that the second end of spring 420 contacts an outer edge of first end 416a of lance body 416. In various embodiments, lance body 416 may be hollow such that the second end of spring 420 contacts an inner surface of lance body 416 between the first end 416a and the second end 416b. In various embodiments, the second end of spring 420 may contact the inner surface of lance body 416 adjacent second end 416b. By extending into lance body 416, spring 420 is held in line and lance body 416 reduces bowing of spring 420 as it extends. Either configuration provides sufficient energy to propel lance end 418 to open a pressurized gas cylinder (e.g., pressurized cylinder 302).

Wire 422 extends through first end 414a of housing 414, wraps around anchor point 424, and extends back through first end 414a so that two strands of wire 422 hold spring 420 compressed in the loaded position. This configuration provides a mechanical advantage that increases the effective tensile strength of wire 422 without increasing the size of wire 422. Initiator 410 may be designed to balance the size, and strength, of spring 420, the size of wire 422, and an amount of current used to break, or melt, wire 422. By increasing the mechanical advantage of wire 422, a smaller wire 422 may break at a lower current and while restraining spring 420 that is larger than possible with a single strand of wire 422.

Anchor point 424 is coupled to first end 416a of lance body 416. In various embodiments, anchor point 424 may include a pin, a hook, a nub, a protrusion, or a bolt head, among others, to hold wire 422 in place. In such embodiments, anchor point 424 may be coupled to an outer surface of lance body 416 or an inner surface of lance body 416. In various embodiments, anchor point 424 may include a rod, or cylinder, that extends across a diameter of lance body 416. In such embodiments, wire 422 may extend through a center of spring 420 to engage anchor point 424.

Figure 5A:
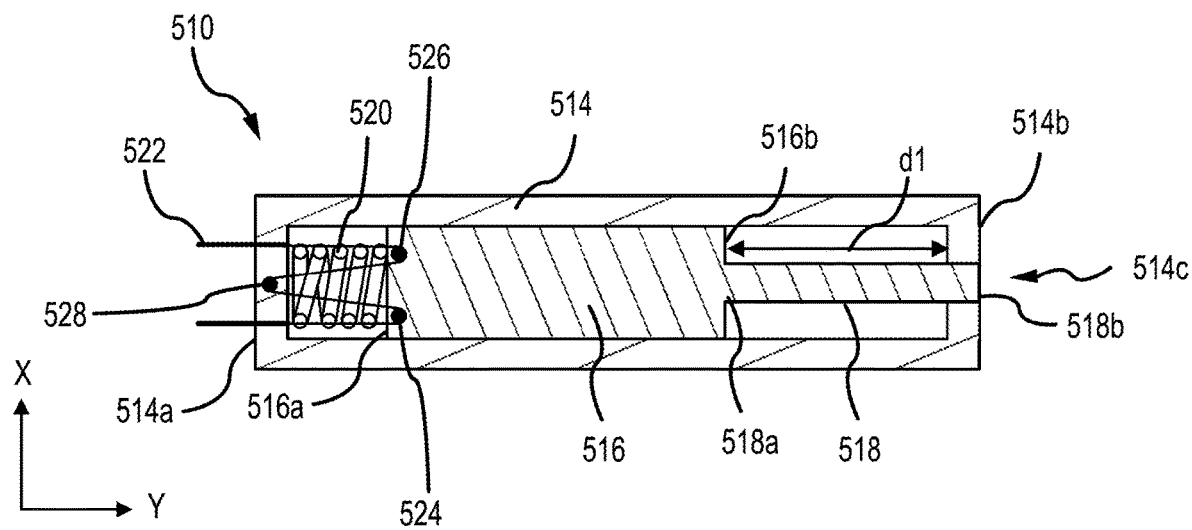
FIGS. 5A and 5B illustrate an electronically activated, spring loaded initiator for opening compressed gas cylinders.
Figure 5B:
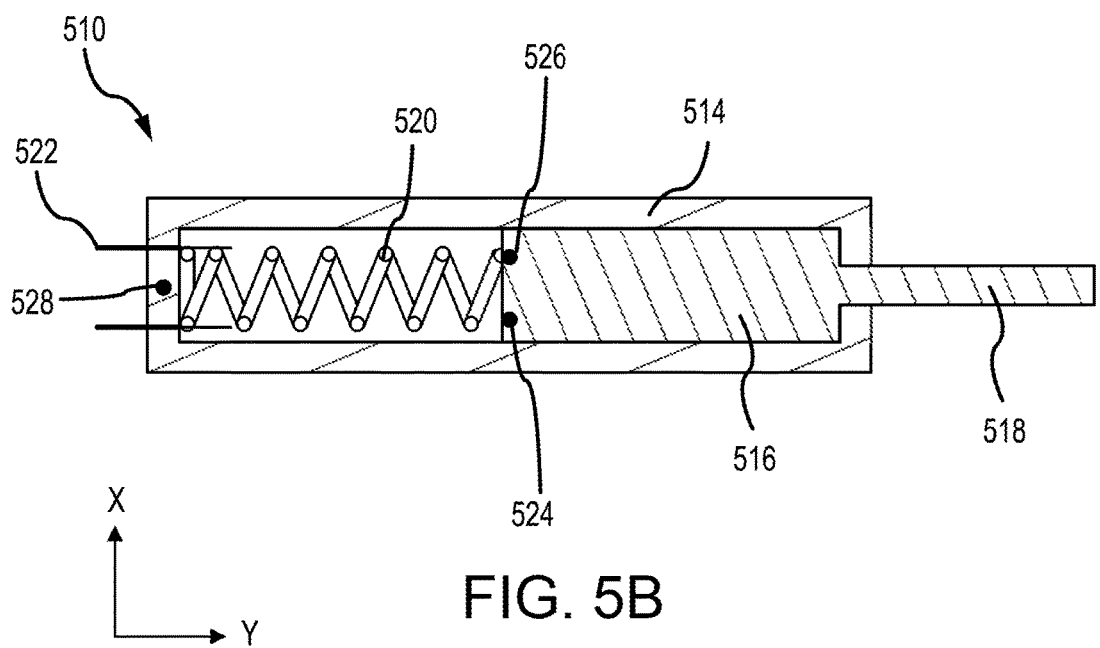

Referring now to FIGS. 5A and 5B, an electronically activated, spring driven initiator, initiator 510, is illustrated, in accordance with various embodiments. Initiator 510 includes similar components to those described above with respect to initiator 410 in FIGS. 4A and 4B including a housing 514 having a first end 514a, a second end 514b, and an opening 514c, a lance body 516 having a first end 516a and a second end 516b, a lance end 518 having a first end 518a and a second end 518b, a spring 520, a wire 522, and a first anchor point 524, descriptions of which may not be repeated below. FIG. 5A illustrates a cross section view of initiator 510 in a loaded position, or state. In the loaded position, lance body 516 and lance end 518 are retracted into housing 514 and spring 520 is compressed. FIG. 5B illustrates a cross section view of initiator 510 in a deployed position, or state. In the deployed position, lance end 518 extends out housing 514 and spring 520 is extended. Initiator 510 further includes a second anchor point 526 and a third anchor point 528.

First anchor point 524 and second anchor point 526 are coupled to lance body 516, similar to anchor point 424 described above in FIGS. 4A and 4B. Third anchor point 528 is coupled to housing 514, and more specifically, to first end 514a of housing 514. As illustrated in FIG. 5A, wire 522 passes through first end 514a into housing 514, wraps around first anchor point 524, wraps around third anchor point 528, wraps around second anchor point 526, and passes through first end 514a out of housing 514. This configuration improves the mechanical advantage of wire 522 by providing, effectively, four lengths of wire 522 to hold spring 520 compressed and in the loaded state. In various embodiments, this configuration allows for the use of a strong spring 520. In various embodiments, this configuration allows for the use of a weaker wire 522 which results in the use of less electric current to break, or melt, wire 522 during actuation of initiator 510.

As previously described, and in various embodiments, wire 522 may pass through the center of spring 520. In various embodiments, first anchor point 524 and second anchor point 526 may be coupled to an inside surface of lance body 516. In various embodiments, first anchor point 524 may be adjacent second anchor point 526. In various embodiments, first anchor point 524 may be opposite second anchor point 526. In various embodiments, wire 522 may be located around an outer circumference of spring 520.

Figure 6A:
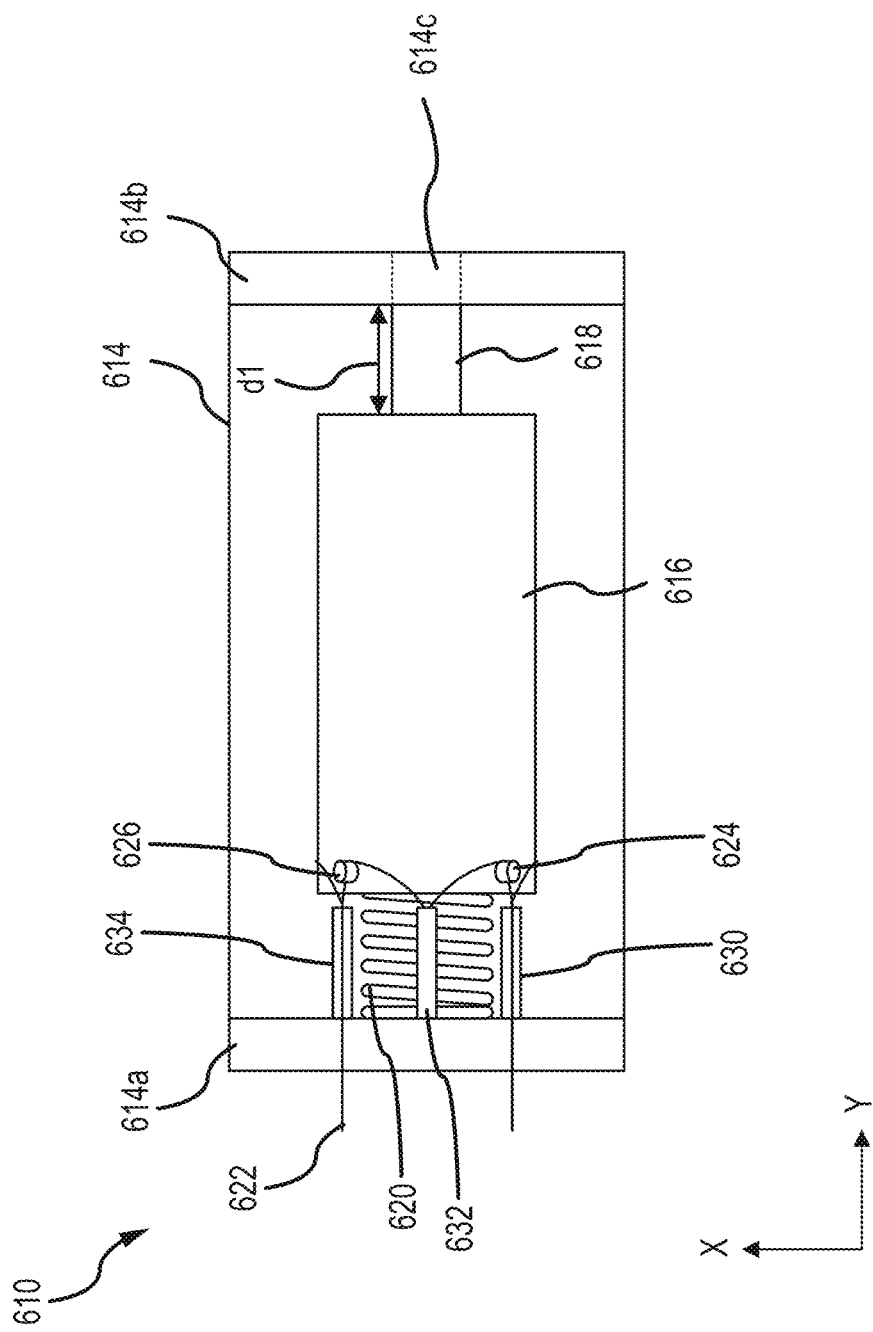
FIGS. 6A and 6B illustrate an electronically activated, spring loaded initiator for opening compressed gas cylinders.
Figure 6B:
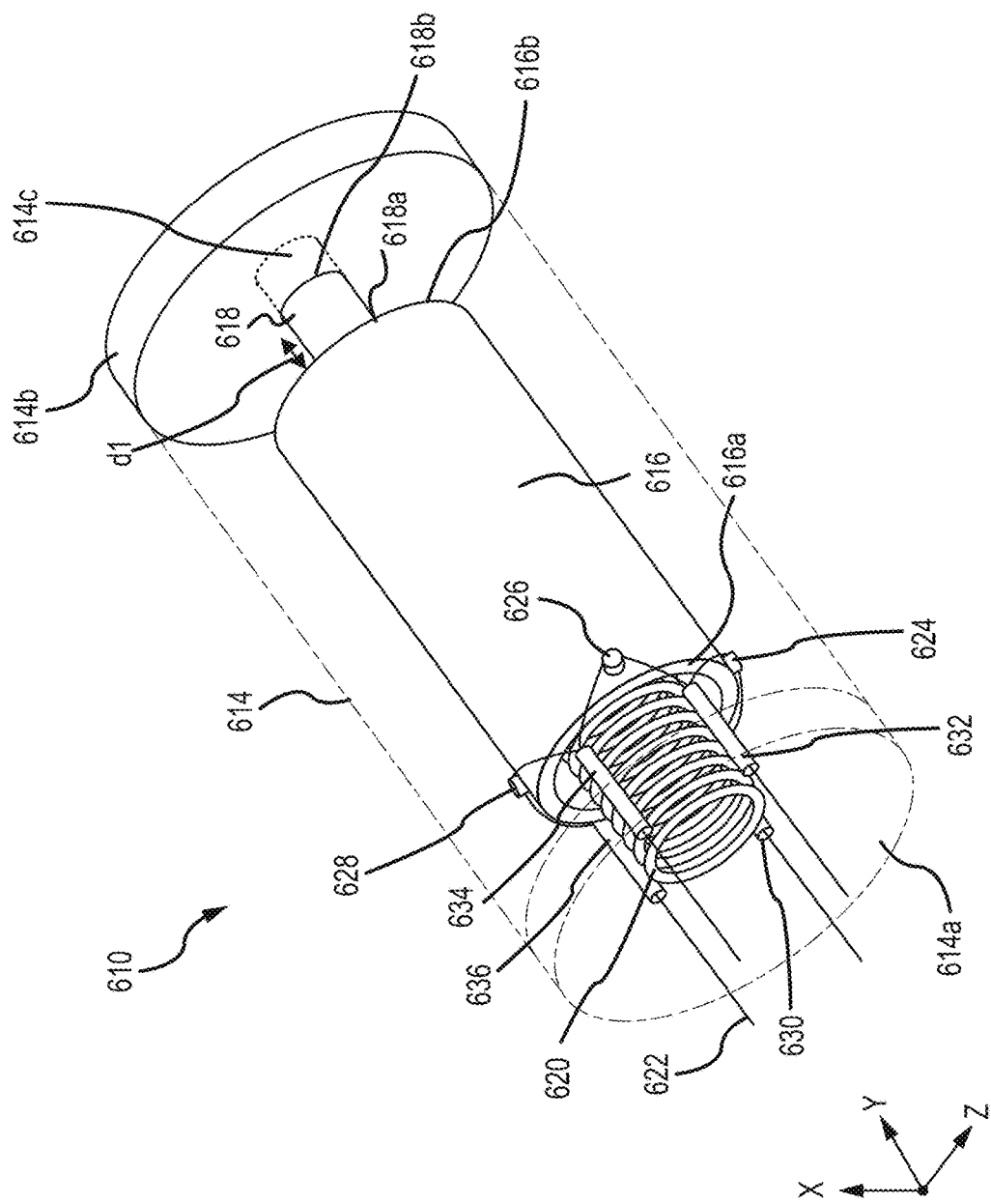

Referring now to FIGS. 6A-6C, an electronically activated, spring driven initiator, initiator 610, is illustrated, in accordance with various embodiments. Initiator 610 includes similar components to those described above with respect to initiator 410 in FIGS. 4A and 4B including a housing 614 having a first end 614a, a second end 614b, and an opening 614c, a lance body 616 having a first end 616a and a second end 616b, a lance end 618 having a first end 618a and a second end 618b, a spring 620, a wire 622, and a first anchor point 624, descriptions of which may not be repeated below. Initiator 610 further includes a second anchor point 626, a third anchor point 628, a fourth anchor point, a fifth anchor point 630, a sixth anchor point 632, a seventh anchor point 634, and an eight anchor point 636. FIG. 6A illustrates a cross section view of initiator 610 in a loaded position, or state. FIG. 6B illustrates a perspective view of initiator 610 in the loaded position. In the loaded position, lance body 616 and lance end 618 are retracted into housing 614 and spring 620 is compressed.

First anchor point 624, second anchor point 626, third anchor point 628, and fourth anchor point are each coupled to lance body 616. In various embodiments, first, second, third, and fourth anchor points 624, 626, 628 are each coupled to the first end 616a of lance body 616. In various embodiments, first, second, third, and fourth anchor points 624, 626, 628 are coupled to an inner surface of lance body 616. In various embodiments, first, second, third, and fourth anchor points 624, 626, 628 are coupled to an outer surface of lance body 616. In various embodiments, first, second, third, and fourth anchor points 624, 626, 628 are spaced equidistant from each other (e.g., 900 offset from each other). In various embodiments, first, second, third, and fourth anchor points 624, 626, 628, are spaced a variable distance from each other. In various embodiments, there may be more than four anchor points coupled to lance body 616.

Fifth anchor point 630, sixth anchor point 632, seventh anchor point 634, and eight anchor point 636 are coupled to housing 614. In various embodiments, anchor points 630, 632, 634, 636 may be posts that extend away from first end 614a of housing 614 and toward lance body 616 (e.g., in the positive y-direction). In various embodiments, anchor points 630, 632, 634, 636 may be hollow so that wire 622 passes through one or more of anchor points 630, 632, 634, 636. In various embodiments, anchor points 630, 632, 634, 636 may be a knob, a pulley, a hook, or other feature to secure wire 622. In various embodiments, anchor points 630, 632, 634, 636 may be spaced equidistance from each other (e.g., 900 offset from each other). In various embodiments, anchor points 630, 632, 634, 636 may be spaced a variable distance from each other. In various embodiments, anchor points 630, 632, 634, 636 may be interleaved between first, second, third, and fourth anchor points 624, 626, 628 so that, for example, each of anchor points 630, 632, 634, 636 is equidistant from each of first, second, third, and fourth anchor points 624, 626, 628 (e.g., 450 offset from each other).

In various embodiments, anchor points 630, 632, 634, 636, along with wire 622, may extend through the center of spring 620. In various embodiments, each anchor point 630, 632, 634, 636, along with wire 622, may extend around an outer circumference of spring 620 (as illustrated in FIG. 6B).

In the illustrated embodiment, wire 622 passes through first end 614a into housing 614, wraps around fifth anchor point 630, wraps around first anchor point 624, wraps around sixth anchor point 632, wraps around second anchor point 626, wraps around seventh anchor point 634, wraps around third anchor point 628, wraps around eighth anchor point 636, wraps around the fourth anchor point and passes through first end 614a out of housing 614. In other words, That is to say, there may be a first plurality of anchor points (e.g., first, second, third, and fourth anchor points 624, 626, 628) that are coupled to lance body 616 and a second plurality of anchor points (e.g., anchor points 630, 632, 634, 636) coupled to first end 614a of housing 614. Wire 622 may enter housing 614, wrap alternatingly around the first plurality of anchor points and the second plurality of anchor points, and exit housing 614. In various embodiments, wire 622 may be glued to one or more anchor points 624, 626, 628, 630, 632, 634, 636. In various embodiments, wire 622 may be encased within one or more anchor points 624, 626, 628, 630, 632, 634, 636.

In various embodiments, wire 622 may enter and exit housing 614 through a single anchor point (e.g., fifth anchor point 630). In various embodiments, multiple wires 622 may be used where each wire 622 engages a different pair of anchor points. In various embodiments, each wire 622 may not be strong enough to hold spring 620 and a first wire 622 may break, or snap, in response to a second wire 622 breaking, or melting, in response to an electric current. In various embodiments, wire 622 may enter housing 614 adjacent an anchor point (e.g., fifth anchor point 630) and wrap around the adjacent anchor point.

Figure 7A:
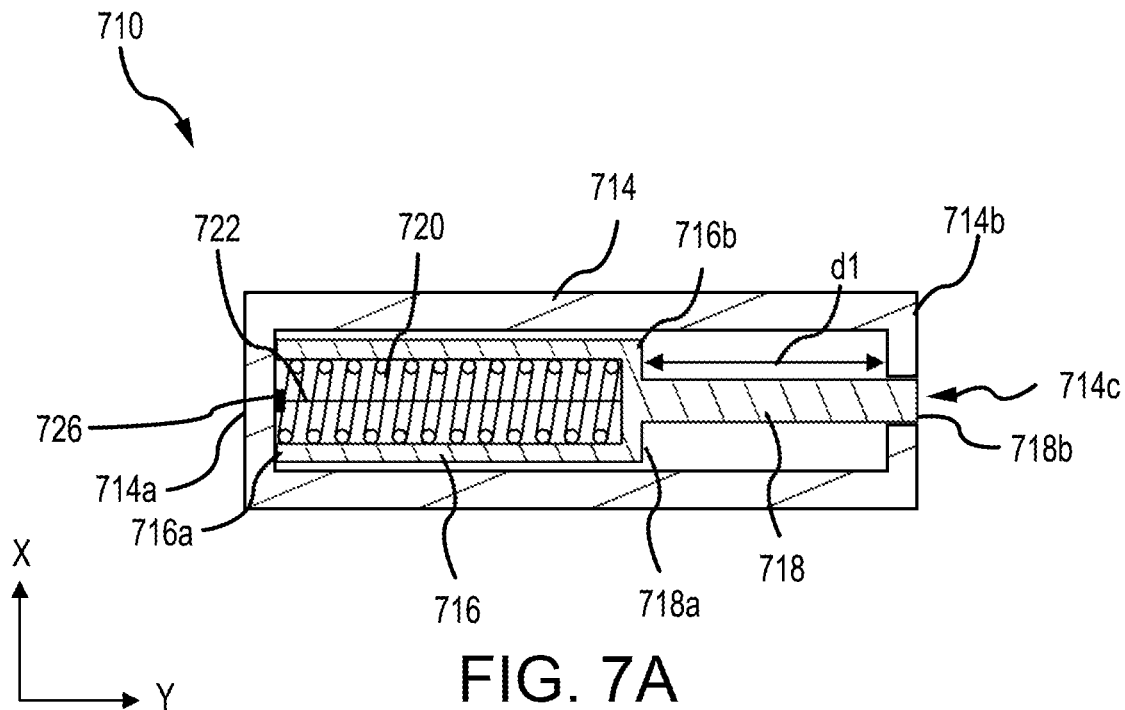
FIGS. 7A and 7B illustrate an electronically activated, spring loaded initiator for opening compressed gas cylinders.
Figure 7B:
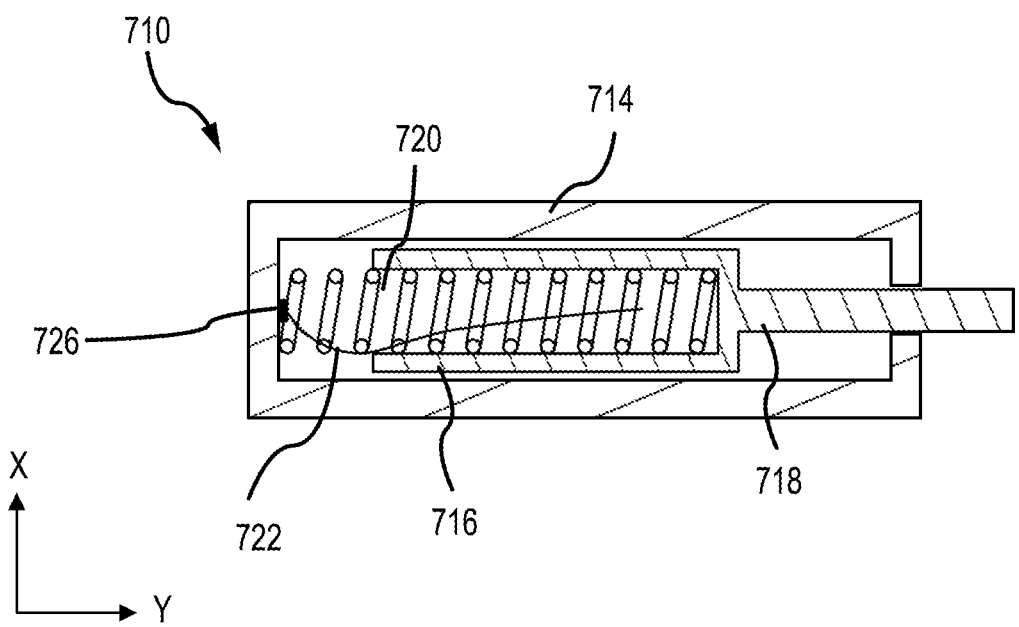

Referring now to FIGS. 7A and 7B, an electronically activated, spring driven initiator, initiator 710, is illustrated, in accordance with various embodiments. Initiator 710 includes similar components to those described above with respect to initiator 410 in FIGS. 4A and 4B including a housing 714 having a first end 714a, a second end 714b, and an opening 714c, a lance body 716 having a first end 716a and a second end 716b, a lance end 718 having a first end 718a and a second end 718b, a spring 720, and a wire 722, descriptions of which may not be repeated below. Initiator 710 further includes an anchor point 726 coupled to the first end 714a of housing 714. FIG. 7A illustrates a cross section view of initiator 710 in a loaded position, or state. In the loaded position, lance body 716 and lance end 718 are retracted into housing 714 and spring 720 is compressed. FIG. 7B illustrates a cross section view of initiator 710 in a deployed position, or state. In the deployed position, lance end 718 extends out of housing 714 and spring 720 is extended.

FIGS. 7A and 7B illustrate spring 720 passing through the center of a tube shaped lance body 716. In various embodiments, this configuration may be implemented in any of the previously described embodiments (e.g., initiators 410, 510, 610) In various embodiments, lance body 716 may be a solid body with spring 720 engaging first end 716a of lance body 716. Wire 722 is coupled to anchor point 726 at one end and to lance body 716 at the other end. In various embodiments, wire 722 may be coupled to first end 716a of lance body 716. In various embodiments, wire 722 may be coupled to second end 716b of lance body 716 (as illustrated in FIG. 7A).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 312(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An initiator for opening a pressurized gas cylinder, comprising:
    a housing having a first end and a second end;
    a lance disposed within the housing, the lance configured to slide from the first end of the housing to the second end of the housing and out through the second end of the housing;
    a spring disposed within the housing between the first end of the housing and the lance;
    a wire coupled to the first end of the housing and to the lance, the wire configured to hold the spring in a compressed state, the wire further configured to break in response to an electric current;
    a first anchor point coupled to the lance;
    a second anchor point coupled to the lance; and
    a third anchor point coupled to the housing, wherein the wire is configured to enter the housing, wrap around the first anchor point, wrap around the third anchor point, wrap around the second anchor point, and exit the housing.

2. The initiator for opening the pressurized gas cylinder of claim 1, wherein the lance further comprises:
    a lance body configured to stay within the housing, wherein the wire is coupled to the lance body; and
    a lance end coupled to the lance body and configured to pass through the second end of the housing.

3. The initiator for opening the pressurized gas cylinder of claim 1, wherein the lance is hollow and has a first end adjacent the first end of the housing and a second end, wherein the spring is disposed between the first end of the housing and the second end of the lance.

4. A system, comprising:
    a compressed gas cylinder; and
    an initiator configured to open the compressed gas cylinder, the initiator including:
        a housing having a first end and a second end;
        a lance disposed within the housing, the lance configured to slide from the first end of the housing to the second end of the housing and out through the second end of the housing;
        a spring disposed within the housing between the first end of the housing and the lance;
        a wire coupled to the first end of the housing and to the lance, the wire configured to hold the spring in a compressed state, the wire further configured to break in response to an electric current;
        a first anchor point coupled to the lance;

a second anchor point coupled to the lance; and a third anchor point coupled to the housing, wherein the wire is configured to enter the housing, wrap around the first anchor point, wrap around the third anchor point, wrap around the second anchor point, and exit the housing.

5. The system of claim 4, wherein the lance further comprises:

a lance body configured to stay within the housing, wherein the wire is coupled to the lance body; and a lance end coupled to the lance body and configured to pass through the second end of the housing.

6. The system of claim 4, wherein the lance is hollow and has a first end adjacent the first end of the housing and a second end, wherein the spring is disposed between the first end of the housing and the second end of the lance.

7. A system, comprising:

a pressurized cylinder;

a manifold coupled to the pressurized cylinder; and an initiator coupled to the manifold and configured to open the pressurized cylinder, the initiator including:

a housing having a first end and a second end;

a lance disposed within the housing, the lance configured to slide from the first end of the housing to the second end of the housing and out through the second end of the housing;

a spring disposed within the housing between the first end of the housing and the lance;

a wire coupled to the first end of the housing and to the lance, the wire configured to hold the spring in a compressed state, the wire further configured to break in response to an electric current;

a first anchor point coupled to the lance;

a second anchor point coupled to the lance; and a third anchor point coupled to the housing, wherein the wire is configured to enter the housing, wrap around the first anchor point, wrap around the third anchor point, wrap around the second anchor point, and exit the housing.

8. The system of claim 7, wherein the lance further comprises:

a lance body configured to stay within the housing, wherein the wire is coupled to the lance body; and a lance end coupled to the lance body and configured to pass through the second end of the housing.

9. The system of claim 7, wherein the lance is hollow and has a first end adjacent the first end of the housing and a second end, wherein the spring is disposed between the first end of the housing and the second end of the lance.

\* \* \* \* \*